April 2, 1968   I. R. ROBINSON ET AL   3,375,718
PRESSURE RESPONSIVE INDICATOR DEVICE
Filed Jan. 29, 1965   2 Sheets-Sheet 1

INVENTORS.
IVOR R. ROBINSON
LEWIS M. CARLTON
BY Kimmel, Crowell & Weaver
ATTORNEYS.

April 2, 1968  I. R. ROBINSON ET AL  3,375,718

PRESSURE RESPONSIVE INDICATOR DEVICE

Filed Jan. 29, 1965  2 Sheets-Sheet 2

INVENTORS.
IVOR R. ROBINSON
LEWIS M. CARLTON

BY Kimmel, Crowell & Weaver
ATTORNEYS.

# 3,375,718
PRESSURE RESPONSIVE INDICATOR DEVICE
Ivor R. Robinson and Lewis M. Carlton, Tulsa, Okla., assignors to Frank W. Murphy Mfr., Inc., Tulsa, Okla., a corporation of Oklahoma
Filed Jan. 29, 1965, Ser. No. 429,081
29 Claims. (Cl. 73—406)

The present invention relates to an indicator device and more particularly to a diaphragm type pressure responsive device.

It is an object of the present invention to provide a diaphragm type pressure device or gauge which allows a maximum extreme of overpressure without distortion or damage on the actuating members which would cause the gauge to become inaccurate.

It is another object of the present invention to provide a pressure gauge and the like having a diaphragm that is self-supporting and with a predetermined linear spring rate and which diaphragm is provided with a plurality of convolutions having their high point coplanar at maximum pressure for each designed pressure range. This structure of the diaphragm permits the use of a flat or non-dished backup plate member for diaphragm protection at high overpressures.

It is another object of the present invention to provide a diaphragm type pressure gauge having a serrated back pressure chamber member, which allows solder to enter and gases to escape from an annulus during the soldering operation when the pressure chamber is soldered together to retain the diaphragm, so as to thereby prevent entrapment of any flux or foreign matter which might cause a leak when the gauge is in service.

It is another object of the present invention to provide a diaphragm type pressure gauge provided with a bridge plate and a spring plate bearing retainer that are easily accessible and therefore renewable should it be necessary to replace the set of parts at the point of their most critical wear. With this structure there is provided a set of screw fasteners so that the spring plate can be loosened and the bell crank arm associated therewith can be readily replaced.

It is another object of the present invention to provide a spring plate which allows a maximum extreme of overpressure without distortion or damage on the actuating members which would cause the pressure gauge to become inaccurate.

Another object of the present invention is to provide a bridge plate with an adjustable recalibrator screw member, which allows easy access through the pressure gauge dial to adjust or recalibrate the instrument at any point on the dial face as measured or checked against a master pressure gauge. With the structure in the present invention, this is accomplished by changing the position of the bell crank member with respect to the position of the diaphragm. Thus, this structure permits recalibration or adjustment of the gauge should it become knocked out of calibration by rough handling in shipment or installation, or due to small amounts of wear on the bell crank arm or the diaphragm actuator pin member.

Another object of the present invention is to provide a diaphragm type pressure gauge in which switch contacts are provided in the gauge at a high or low pressure range, or both, for example, 50% of the scale, and the switch contact and the gauge pointer contact "makes" in a general construction type diaphragm gauge, will not be damaged due to a possibility of overpressure beyond the set stop point, that will cause bending of the pointer or other mechanism. In accordance with the present invention, any over-travel of the pointer mechanism because of overpressure beyond the set stop point will be absorbed by the spring plate bearing member to thereby prevent damage to the instrument.

Another object of the present invention is the provision of a diaphragm type pressure gauge in which the pointer needle or assembly is a stamping that provides support at both the top and the bottom with a removable bearing in assembly which can be field replaced when wear occurs.

It is another object of the present invention to provide a pressure gauge having an indicator pointer that is balanced by the provision of a heavier portion of the pointer at the lower end thereof which counterbalances the long pointer shaft extension and eliminates damage which is normally caused by vibration in most instruments.

It is another object of the present invention to provide a diaphragm type pressure gauge with cutoff means that progressively cuts off or decreases the pressure acting against the diaphragm as the maximum design pressure is reached. This cutoff means is incorporated particularly where abnormally high overpressures may be encountered which could burst the diaphragm and allow passage of the pressure fluids or gases into the case of the device. This feature, then, provides not only protection for the gauge mechanism but also is a safety factor offering a protection to personnel and adjacent equipment.

It is another object of the present invention to provide a pressure type diaphragm gauge with a structure that eliminates the necessity for a heavy backup plate for the diaphragm to seat against when subjected to above normal pressure.

It is another object of the present invention to provide a diaphragm type pressure gauge that is provided with a removable pressure connector which allows air, oil or gas to enter the diaphragm area through a very small orifice and into a surge or pulsation dampening chamber to effectively eliminate pulsation or pointer contact flutter and to provide steady pressure readings in addition to minimizing bearing wear.

It is another object of the present invention to provide a diaphragm type pressure gauge that can be readily converted to a temperature gauge by adding a filled capillary system and a heat sensitive bulb to which a chemical which expands at a known rate when exposed to heat, for example methylene chloride, or other similar chemicals, so that we have a temperature gauge with the same general type of construction as the pressure gauge.

Various other objects and advantages of the present invention will be readily apparent from the following detailed description when considered in connection with the accompanying drawings forming a part hereof and in which.

Figure 1:
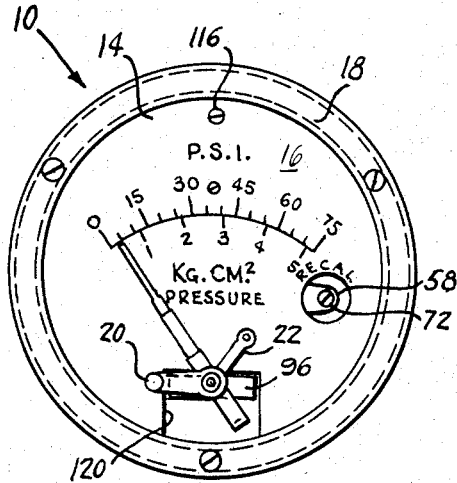
FIGURE 1 is a view of the pressure gauge of the present invention showing the pointer and stop member and dial face.

Referring to the drawings, the reference numeral 10 generally designates a diaphragm type pressure gauge provided with a cylindrical casing or housing 12 with a graduated dial face 14 over which is disposed a transparent face cover 16 secured in front of the dial face 14 by a conventional ring member 18 having screws that are threaded through a corresponding outwardly extending flange or ring disposed on front of the casing 12.

In the particular embodiment shown in FIGURE 1, a metal switch contact 20 and a stop arm 22 are secured to the face cover 16 which preferably is of plastic transparent material.

The rear 24 of the casing is provided with openings therein for receiving screws that secure a substantially circular frame or base support 26 to the rear 24 of the casing.

Figures 3, 5:
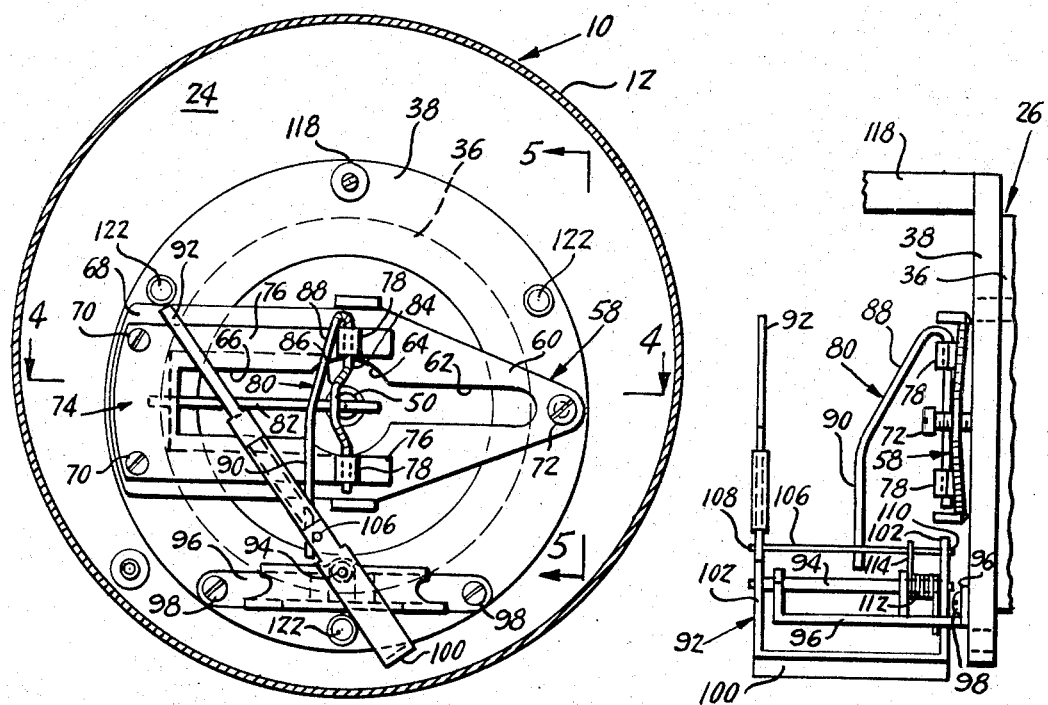
FIGURE 3 is an enlarged view taken along line 3—3 of FIGURE 2.
FIGURE 5 is a view taken along the line 5—5 of FIGURE 3.
Figures 4, 10:
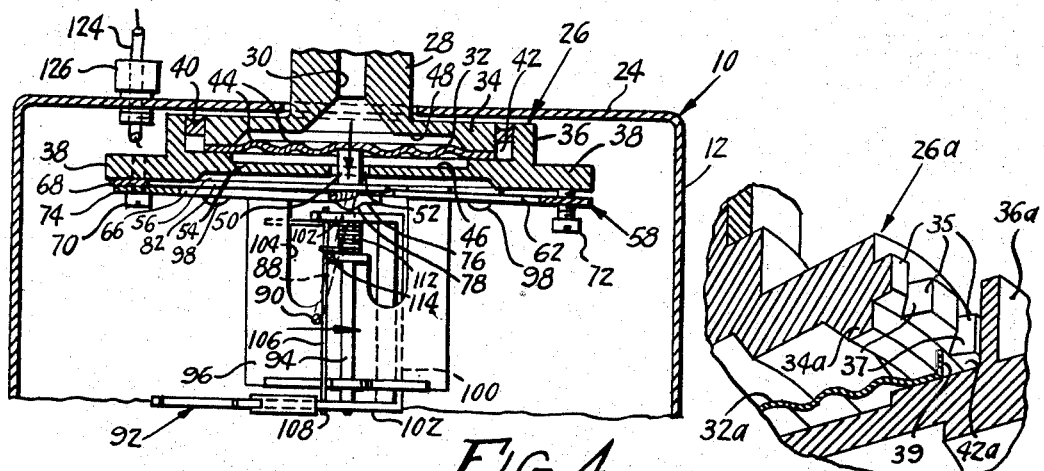
FIGURE 4 is a sectional view taken along the line 4—4 of FIGURE 3.
FIGURE 10 is a perspective view illustrating a modification of the invention shown in FIGURE 3, in which the back pressure chamber plate has a serrated peripheral edge.

Referring to FIGURES 4 and 5, the base member 26 is provided with a threaded connection which extends out an opening in the rear 24 for connection to a source of pressure, not shown. The connection 28 is provided with an orifice 30 in communication with a diaphragm 32.

The base or frame 26 consists of two circular portions 34 and 36 respectively, with the portion 34 having a smaller diameter than the portion 36 and the portion 36 having an outwardly extending flange 38, as best shown in FIGURE 3.

The portions 34 and 36 have the diaphragm 32 sandwiched therebetween and solder 40 is disposed in the annular recess 42 between the inner diameter of portion 36 and the outer diameter of portion 34, so as to secure these two parts together.

It will be noted that the diaphragm 32 is provided with a plurality of continuous annular convolutions 44 formed therein which convolutions are coplanar at a maximum pressure for their designed pressure range. The interior of the portion 36 is provided with a central recess 46 while the interior of the portion 34 is provided with a central recess 48 therein. The pressure chamber of the guage is provided by the portions 34 and 36 and the diaphragm 32 is disposed between the central recesses 46 and 48 as seen in FIGURE 3. A cylindrical projection 50 is disposed on the side of the diaphragm 32 adjacent recess 46 and extends through a small opening 52 formed in the wall 54 of the portion 36. Pressure acting through orifice or passage 30 moves the diaphragm 32 in a direction indicated by the arrow in FIGURE 4 so as to progressively move projection 50 through the opening 52. When the pressure decreases in the passage 30 the diaphragm 32 returns to its natural free state. Since the high point of all the convolutions 44 in the diaphragm are coplanar at maximum pressure for the designed pressure range, this structure permits the use of a flat or non-dished backup plate namely the wall 54 for diaphragm protection at high over-pressures.

The front of the wall or plate 54 is provided with a central circular recess 56 therein and has a bridge plate 58 secured thereto.

Referring to FIGURE 3, the bridge plate 58 has a triangular shaped right end 60 with an elongated slot 62 therein, a circular slot or opening 64 disposed therein in alignment with the projection 50, and to the left of the circular opening 64 there is provided a rectangular slot 66 with the left end 68 of the bridge secured by two spaced screws 70 to the flange 38. An adjustment or recalibration screw 72 is threaded through the spring plate right end 60 for moving the plate toward and away from the diaphragm 32, as shown in FIGURE 4.

A spring plate bearing retainer member 74 is mounted on top of the spring plate 58 by the screws 70. The spring plate 74 is substantially U-shaped with two spaced legs 76 extending beyond the opening 64, as shown in FIGURE 3, and disposed adjacent the top and bottom of this opening. The legs 76 are provided with semi-circular bearings 78 for receiving portions of a bell crank arm 80. The legs 76 are resilient as is the wire member 82 extending horizontally between the legs 76 and beyond the projection 50 as seen in FIGURE 3.

It will be noted that the rear leg portion 84 of the bell crank arm 80 has an offset portion 86 disposed in alignment with the projection 50. The movement of the projection 50 in the direction of the arrow of FIGURE 4 causes the projection 50 to move the wire member 82 away from the rear 24 of the casing and to turn the offset portion 86 with respect to the portions of the rear leg portion 84 within the semi-circular bearings 78. The upper end of the rear leg portion 84 is bent downwardly and at an inclinded angle so as to form a leg portion 88 as best seen in FIGURE 5 extending toward the front of the casing. The lower end of the leg portion 88 terminates in a straight downwardly extending vertical portion 90. The movement of the offset portion 86 in a direction toward the right, when looking at FIGURE 3, causes the upper leg portion 88 and the vertical leg portion 90 to also move toward the right, when looking at the illustration of FIGURE 3.

A pointer needle or indicator 92 is disposed on a horizontal shaft 94 carried by a bracket 96 secured by screws 98 to the flange 38. The upper end of the pointer 92 is balanced by a heavier U-shaped portion 100 with the vertical legs 102 of the U-shaped portion 100 being disposed for rotation on the shaft 94. The rear leg 102 of the U-shaped portion 100 extends through a slot or opening 104 in the bracket 96 as best seen in FIGURE 4.

Disposed above the shaft 94 and extending parallel thereto is a wire member 106 having its forward end 108 and its rear end 110 secured to the upper end of the sheet metal legs 102 of the U-shaped portion 100 of the pointer member. The wire member 106 is disposed in a plane above the lower end of the vertical leg portion 90 of the bell crank arm, as best shown in FIGURES 3 and 5, so that movement of the vertical portion 90 to the right in FIGURE 3 will cause the pointer 92 to move to the right, or in a clockwise direction to indicate the pressure on the dial face 14 of FIGURE 1. A torsion spring 112 is secured on the rear of the shaft 94 and has an end 114 extending above the wire member 106 so as to normally bias it to a non-indicating position.

The dial face 14 is secured by a screw 116 disposed in a threaded tube 118 to the flange 38 and the dial 14 has a slot 120, see FIGURE 1, in its lower end which mates with the front end of the bracket 96.

The frame or support 26 is secured to the rear of the casing 24 by screws not shown, threaded through the internally threaded sleeves 122 spaced around the circumference or peripheral edge of the flange 38.

In the operation of the embodiment of the invention shown in FIGURES 1 to 5, the pressure is communicated through the orifice or passage 30 to the interior of the pressure chamber and acts against the side of the diaphragm 44 adjacent the recess 48. The greater the pressure acting on the convoluted diaphragm 44, the greater will be the movement of the projection 50 in the direction of the arrow shown in FIGURE 4. The movement of the projection 50 through the opening 52 will move the end of the wire member 82 against the offset portion 86 of the bell crank 80. As the pressure increases the bell crank 80 and the offset portion 86 will be moved to the right, looking at FIGURE 3, or turned in a counterclockwise direction, when looking downwardly on the embodiment or illustration shown in FIGURE 4. The movement of the offset portion 86 will cause the leg portion 88 and the vertical portion 90 to also move to the right or in the direction of the arrow shown in FIGURE 4, and if the leg 90 moves sufficiently far enough, it will cause the wire member 106 to move the pointer 92 and the pointer legs 102 in a clockwise direction until the pointer makes contact with the stop member 22, shown in FIGURE 1. Since the stop member 22 and the switch contact 20 are metal and insulated by being carried on the transparent plastic face cover 16, if desired a conductor 124 shown in FIGURE 2 attached or in contact with the switch contact 20 can actuate a switch, not shown.

It will be noted that in the structure of the present invention, since the diaphragm is self-supporting and it has a predetermined linear spring rate, and the high point of all the convolutions in the diaphragm are coplanar at maximum pressure for each designed pressure range, it is not necessary to provide any special diaphragm protection for high overpressures. It is only necessary that a substantially thin or small wall 54 which is flat and non-dished back up the diaphragm.

In the present invention, since the bridge plate 58 carries the spring plate bearing retainer 74, it is only necessary to unscrew the two screws 70 if it is desired to replace the spring plate bearing retainer 74 or the crank arm 80. It will also be noted that because the spring plate retainer member 74 is made of resilient thin metal, it allows a maximum extreme overpressure without distortion or damage on the actuating members which would cause other gauges to become inaccurate.

The present invention further provides an adjustable recalibrator screw 72 which allows easy access through the opening in the front of the dial 14, as best shown in FIGURE 1, so that the position of the bell crank, carried or mounted on the bridge plate 58 by virtue of being mounted on the spring plate bearing retainer 74, can be adjusted relative to the diaphragm 32.

The present invention further provides a structure in which an overpressure beyond the set stop point, namely the setting of the stop 22, will not cause bending of the pointer 92 or other mechanism due to the fact that the spring plate bearing allows this overtravel to be absorbed by the spring and thereby prevents damage to the movement.

Another feature of the present invention is the fact that there is a balancing of the indicator pointer 92 since the pointer assembly is a stamping that provides support at both its top and bottom, with a removable bearing in assembly which can be field replaced when wear occurs. It will be noted that the heaviest portion of the pointer 92 is at the lower end which counterbalances the long pointer shaft extension and eliminates damage which is normally caused by vibration in most instances.

Figure 8:
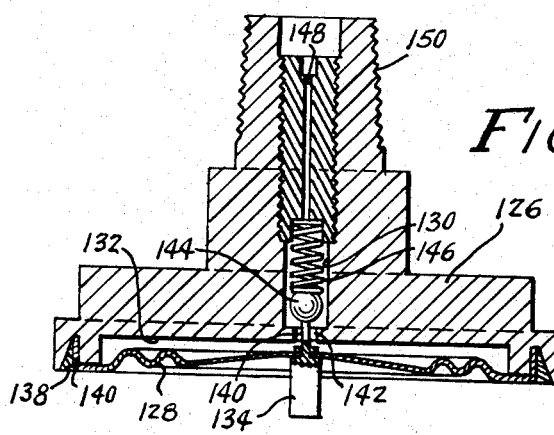
FIGURE 8 is a sectional view illustrating a modification of the pressure gauge shown in FIGURE 1.
Figure 9:
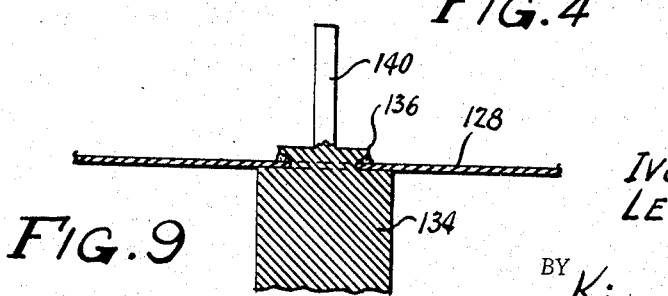
FIGURE 9 is a detailed view of a portion of the gauge shown in FIGURE 8.

Referring to the embodiment of the invention shown in FIGURES 8 and 9, this is substantially the same in structure and operation as that already described in connection with FIGURES 1 to 5, except that the support or frame 126 which carries the diaphragm 128 is provided with valve means for closing off communication between the pressure of fluid in passage 130 and the recess 132 adjacent one side of the diaphragm 128, when the pressure exceeds a certain predetermined value. The projection 134 which actuates the wire member 82 and the bell crank arm 80, already described, is staked at 136 to the inner peripheral edge of the diaphragm 128. The outer end of the diaphragm or the circumference thereof is secured to the support 126 by a circular bead of solder 138 disposed in a complementary corresponding recess 140 in the inner end of the support 126. The rear end of the projection 134 is provided with a reduced projection or bar 140 which extends through a valve opening 142 disposed in the support 126. The inner end of the bar 140 abuts against a ball type valve 144 normally biased by a spring member 146 toward the valve opening 142. The spring 146 and the ball valve 144 are disposed in the passage 130 which passage 130 communicates with an orifice 148 in the threaded connection 150. As the diaphragm 128 and the ball member move downward in FIGURE 8, as the pressure in the passage 130 and 148 progressively increases, the ball 144 will eventually seat on the valve opening 142 so as to close off communication between the passage 130 and the recess 132 on the right side of the diaphragm 128. Thus, this structure provides a diaphragm actuated cutoff valve that provides complete overpressure protection to the diaphragm of a diaphragm type pressure gauge or pressure switch when it is subjected to an above maximum design pressure. As pressure is relieved in passage 130 the ball 144 is lifted off seat 142 allowing re-establishment of pressure communication between passage 130 and recess 132.

Figure 6:
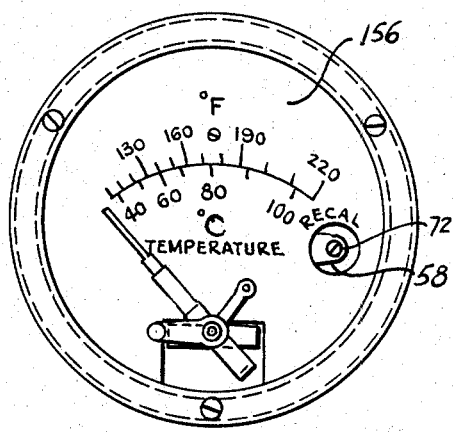
FIGURE 6 is a view similar to FIGURE 1 but illustrating the pressure gauge converted to a temperature gauge.
Figure 2:
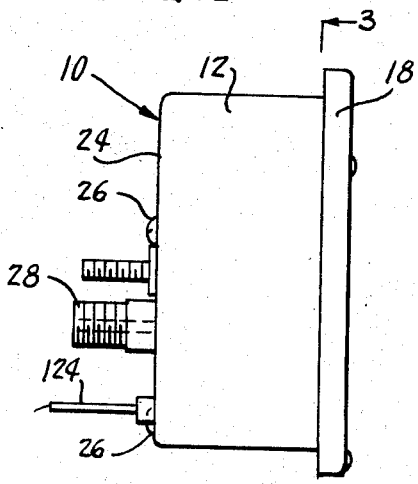
FIGURE 2 is a side elevational view of the pressure gauge of FIGURE 1.
Figure 7:
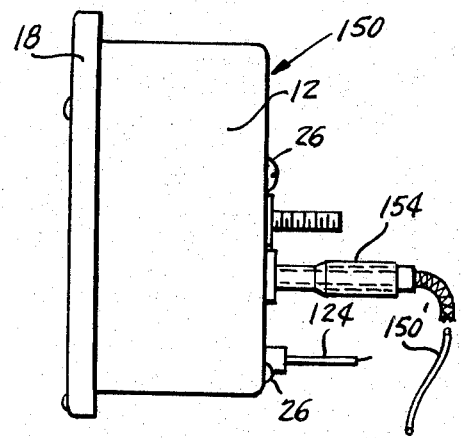
FIGURE 7 is a side elevational view of FIGURE 6 illustrating the capillary system and heat sensitive bulb utilized to convert the same type pressure gauge structure to a temperature gauge.

Referring to the embodiment of the invention shown in FIGURES 6 and 7, this is a temperature gauge device 150 made simply from a diaphragm type pressure gauge, such as that described in FIGURES 1 to 5, simply by adding a filled capillary system consisting of a tube 150 covered by a briaded cable 152 to the conventional connector 154 of the pressure gauge. A heat sensitive bulb 154 is disposed adjacent the end of the tube 150 and the tube 150 is filled with a chemical which expands at a known rate when exposed to heat, for example methylene chloride so that we have a temperature gauge. The dial face 156 of the temperature gauge is provided with a temperature scale in the present instance, instead of the pressure scale as shown in FIGURE 1. The internal structure, such as the bridge 58 and the recalibration screw 72, as shown in FIGURE 6, are all identical with the structure already described in connection with FIGURES 1 to 5.

In the embodiment shown in FIGURE 10, the base or frame 26a consists of two circular portions 34a and 36a, similar to portions 34 and 36 of FIGURE 3, except that portion 34a is provided with a plurality of circumferentially spaced radial projections or teeth 35 thereon, or trapezoidal configuration to provide a serrated edge with gaps or notches 37 therebetween. The teeth 35 are disposed between the top and bottom surfaces of 34a, as is clearly shown in FIGURE 10.

During assembly of this embodiment of the invention the parts are preferably held together by fixture clamps after being fitted together and solder is run into the peripheral channel. The solder migrates through the tooth-like gaps or recesses 37 into the annulus 42a at the junction of the three members, thereby joining and sealing the parts together. It will be noted that the diaphragm 32a is provided with a turned up rim 39 around its periphery.

These peripheral gaps facilitate and encourage the inflow of solder and outflow of gases and flux. This then insures a good solid mechanical joint and provides a leak-tight joint seal.

With the present invention the pointer and its actuating linkage can be eliminated and a simple set of pressure contacts can be mounted on the portion 36 or its flange 38 in such a manner that the pressure contacts are brought together at a predetermined pressure and consequent position of the diaphragm thus completing an electric circuit. With such contacts or a refined arrangement such as a snap action type electrical pneumatic or hydraulic switching device the system becomes a simple pressure switch rather than an indicating gauge or a switch gauge.

Inasmuch as various changes may be made in the form, location, and relative arrangement of the several parts of the invention without departing from the essential characteristics of the invention, it will be understood that the invention is not to be limited except by the scope of the appended claims.

What is claimed is:

1. An indicator device having a graduated face dial comprising a pressure chamber, a flexible diaphragm in said chamber, passage means for transmitting fluid pressure against one side of said diaphragm for movement thereof, bell crank means operatively connected to said diaphragm for movement thereby, and a rotatable pointer operatively connected to said bell crank means for indicating a predetermined value on said dial face corresponding to the amount of rotational movement of said pointer, wherein said pressure chamber is formed of two circular members of different diameter, and said diaphragm is circular and has its peripheral edge disposed between said two members, and each of said members has a recess formed on opposite sides of said diaphragm, and said diaphragm has a plurality of annular coplanar convolutions therein, and projection means on said diaphragm extend through an opening in one of said chamber members for actuation of said bell crank means, wherein said projection means has a bar extending into said passage means, said passage means has a valve opening through which said bar extends, a valve abuts against said bar, and biasing means are disposed to urge said valve toward a seated position over said valve opening.

2. The device of claim 1 wherein said projection is staked to said diaphragm.

3. An indicator device with a graduated face dial comprising two circular members of different diameter each having a recess therein, a flexible diaphragm disposed between said recesses and having a periphery secured between said members to form a pressure chamber, fluid passage means in communication with one side of said diaphragm for transmitting pressure against said diaphragm, said diaphragm having a plurality of continuous circular coplanar convolutions therein, the larger of said circular members having an opening therein, a projection on said diaphragm extending through said opening, a bridge plate secured to said larger circular member and extending across said opening, a spring plate bearing retainer carried by said bridge plate, a bell crank member rotatably mounted in said bearing retainer and disposed in alignment with said projection for rotatable movement thereby, a pointer frame disposed at right angles with respect to said larger circular member, a shaft on which said pointer frame is rotatably mounted, said bell crank member having a leg in contact with said frame for rotational movement of said frame about said shaft, and a pointer needle carried by said frame for indicating a predetermined value on said dial face corresponding to the amount of rotational movement of said frame, wherein said projection has a portion extending through said diaphragm and into said fluid passage means, a valve seat is in said passage means, and a valve is provided to seat on said seat, biasing means to urge said valve toward said seat, and said projection portion urges said valve away from said seat until a predetermined pressure value is exceeded, said valve mechanism being removable to facilitate flush cleaning of the diaphragm pressure chamber.

4. An indicator device with a graduated face dial comprising two circular members of different diameter each having a recess therein, a flexible diaphragm disposed between said recesses and having a periphery secured between said members to form a pressure chamber, fluid passage means in communication with one side of said diaphragm for transmitting pressure against said diaphragm, said diaphragm having a plurality of continuous circular coplanar convolutions therein, the larger of said circular members having an opening therein, a projection on said diaphragm extending through said opening, a bridge plate secured to said larger circular member and extending across said opening, a spring plate bearing retainer carried by said bridge plate, a bell crank member rotatably mounted in said bearing retainer and disposed in alignment with said projection for rotatable movement thereby, a pointer frame disposed at right angles with respect to said larger circular member, a shaft on which said pointer frame is rotatably mounted, said bell crank member having a leg in contact with said frame for rotational movement of said frame about said shaft, and a pointer needle carried by said frame for indicating a predetermined value on said dial face corresponding to the amount of rotational movement of said frame, wherein the periphery of the smaller diameter member is serrated to allow easy passage for solder in, and gases and flux out, during soldering of the two members together with the periphery of the diaphragm clamped therebetween.

5. In a gauge of the type which includes a casing, means defining a pressure chamber, a flexible diaphragm in the pressure chamber, a fluid passage communicating with the pressure chamber, a movable indicator, and motion transfer means for moving the indicator in response to the movement of the diaphragm, the improvement wherein the motion transfer means comprises:
 a flexible member extending generally across the diaphragm and lying generally parallel thereto;
 means mounting one end of the member fixedly with respect to an edge of the diaphragm and independently of the casing;
 a pivotal member having an axis of rotation and an eccentric portion which includes means operatively engaged for moving the indicator when said pivotal member is rotated;
 means pivotally mounting the pivotal member to the flexible member;
 means for transmitting motion of the diaphragm to the eccentric portion of the pivotal member for rotating said pivotal member; and
 means for adjusting the position of the flexible member relative to the diaphragm, said adjusting means being independent of the position of the casing relative to the diaphragm for thereby adjusting the indicator independently of the position of the diaphragm and of the casing to thereby prevent changes in calibration or accuracy resulting from distortion or stressing of the casing.

6. The gauge of claim 5 wherein the means mounting the flexible member independently of the casing comprises:
 at least one rigid member defining a portion of the pressure chamber, said rigid member having a passage therethrough for receiving motion transmitting means; and
 means securing one side of the flexible member to a point proximate one side of the rigid member for extension across the passage toward the other side of the rigid member.

7. The gauge of claim 6 wherein the means securing one side of the flexible means to the rigid member comprises:
 means constructed and disposed for biasing the other side of the flexible means toward the rigid member;
 and wherein the adjusting means comprises:
  means for moving the other side of the flexible means against the resilient force thereof away from the rigid member.

8. The gauge of claim 6 wherein the pressure chamber comprises:
 two circular members of different diameter having a recess therein, the flexible diaphragm being disposed between said recesses and having a periphery secured between said members to form a pressure chamber, the improvement wherein the periphery of the smaller diameter member is serrated to allow easy passage of solder in, and gases and flux out, during soldering of the two members together with the periphery of the diaphragm clamped therebetween.

9. The gauge of claim 5 further comprising:
 a face plate having calibrated indicia thereon and an opening therethrough;
 and wherein:
 the adjusting means is aligned with said opening for allowing calibration adjustment from the front of the indicator.

10. The gauge of claim 9 wherein the adjusting means comprises:
 a screw threadably received in the flexible member adapted to engage the means defining the pressure chamber for adjusting the distance between the flexible member and the means defining the pressure chamber.

11. The gauge of claim 5 wherein the means mounting the pivotal member comprises:
means resiliently biasing the pivotal member normally against the flexible member for permitting movement of the pivotal member from the flexible member when movement of the indicator is restrained.

12. The gauge or claim 11 wherein the resilient biasing means comprises:
a pair of resilient fingers biasing the pivotal member toward the diaphragm.

13. The gauge of claim 5 wherein the means defining a pressure chamber includes a substantially planar wall for limiting the movement of the diaphragm in one direction when pressure is applied in the chamber to the other side of the diaphragm; and
the diaphragm is normally curved and is provided with a plurality of convolutions which are coplanar when a predetermined maximum pressure is applied to the other side thereof, said convolutions being constructed and disposed to rest against the planar wall when said maximum pressure is applied.

14. The gauge of claim 5 wherein the motion transfer means comprises:
engaging means secured to the diaphragm for movement therewith;
a resilent tongue secured at one end in the casing, the other end being free for movement, said tongue being normally engaged by the engaging means on the diaphragm;
said tongue normally being in engagement with the pivotal member for substantially linearly transferring motion from the engaging means on the diaphragm to the pivotal member regardless of nonalignment or asymmetry in the engaging means and for reducing the effect of wear during use.

15. The gauge of claim 14 further comprising an end member to which the resilient tongue is secured at one end, said end member being fixedly secured to the means defining the pressure chamber; and
a pair of resilient fingers extending from said end member, said resilient fingers forming means for resiliently pivotally mounting the pivotal member to the flexible member.

16. The gauge of claim 5 wherein the motion transfer means comprises:
means for transferring motion from the diaphragm to rotate the pivotal member;
a linear member on the indicator lying substantially perpendicularly to the axis of the pivotal member and disposed proximate one end thereof; and
an elongate member extending from the other end of the pivotal member to a point spaced therefrom and then extending approximately parallel to the axis of the pivotal member to engage the linear member on the indicator for moving said linear member when the pivotal member is rotated to thereby permit calibration of the gauge after assembly by varying the shape and disposition of the elongate member.

17. The gauge of claim 5 wherein the indicator comprises:
a pointer member;
means supporting the pointer member for rotation about an axis; and
means on the other side of the axis from the pointer member constructed and disposed to balance the pointer member.

18. The gauge of claim 5 further comprising:
means in the fluid passage defining a valve seat;
valve means biased toward said valve seat for closing the passage; and
means secured for movement by the diaphragm for controlling the valve means for closing the passage when a predetermined pressure in the chamber has moved the diaphragm a predetermined distance to thereby prevent excessive pressure from building up in the chamber.

19. In a gauge of the type which includes a casing, means defining a pressure chamber, a flexible diaphragm in the pressure chamber, a fluid passage communicating with the pressure chamber, a movable indicator and motion transfer means for moving the indicator in response to movement of the diaphragm, the improvement wherein:
the means defining a pressure chamber includes a substantially planar wall for limiting the movement of the diaphragm in one direction when pressure is applied in the chamber to the other side of the diaphragm; and
the diaphragm is normally curved and is provided with a plurality of convolutions which are coplanar when a predetermined maximum pressure is applied to said other side thereof, said convolutions being constructed and disposed to rest against the planar wall when said maximum pressure is applied.

20. In the gauge of claim 19, the improvement wherein the motion transfer means comprises:
engaging means secured to the diaphragm for movement therewith;
a resilient tongue secured at one end in the casing, the other end being free for movement, said tongue being normally engaged by the engaging means;
crank arm means pivotally secured in the casing; and
means secured to the crank arm for moving the indicator when said crank arm is rotated;
said tongue normally being in engagement with the crank arm for substantially linearly transferring motion from the engaging means on the diaphragm to the crank arm regardless of nonalignment or asymmetry in the engaging means and for reducing the effect of wear during use.

21. In the gauge of claim 20, the improvement where the means secured to the crank arm for moving the indicator comprises:
a linear member on the indicator lying substantially perpendicular to the axis of the crank arm and disposed proximate one end thereof;
an elongate member extending from the other end of the crank arm to a point spaced therefrom and then extending approximately parallel with the axis of the crank arm to engage the linear member of the indicator for moving said linear member when the crank arm is rotated to thereby permit calibration of the gauge after assembly by varying the shape and disposition of the elongate member.

22. In the gauge of claim 21, the improvement further comprising:
means in the fluid passage defining a valve seat;
valve means biased toward said valve seat for closing the passage; and
means secured for movement by the diaphragm for controlling the valve means for closing the passage when a predetermined pressure in the chamber has moved the diaphragm a predetermined distance to thereby prevent excessive pressure in the chamber.

23. In the gauge of claim 20, the improvement further comprising:
means in the fluid passage defining a valve seat;
valve means biased toward said valve seat for closing the passage; and
means secured for movement by the diaphragm for controlling the valve means for closing the passage when a predetermined pressure in the chamber has moved the diaphragm a predetermined distance to thereby prevent excessive pressure in the chamber.

24. In a gauge of the type which includes a casing, means defining a pressure chamber, a flexible diaphragm in the pressure chamber, a fluid passage communicating with the pressure chamber, a movable indicator and motion transfer means for moving the indicator in response to movement of the diaphragm, the improvement wherein the motion transfer means comprises:

engaging means secured to the diaphragm for movement therewith;

a resilient tongue secured at one end in the casing, the other end being free for movement, said tongue being normally engaged by the engaging means;

crank arm means pivotally secured in the casing; and means secured to the crank arm for moving the indicator when said crank arm is rotated;

said tongue normally being in engagement with the crank arm for substantially linearly transferring motion from the engaging means on the diaphragm to the crank arm regardless of nonalignment or asymmetry in the engaging means and for reducing the effect of wear during use.

25. In the gauge of claim 24, the improvement in the motion transfer means which further comprises:

a linear member on the indicator lying substantially perpendicular to the axis of the crank arm and disposed proximate one end thereof;

an elongate member extending from the other end of the crank arm to a point spaced therefrom and then extending approximately parallel with the axis of the crank arm to engage the linear member on the indicator for moving said linear member when the crank arm is rotated to thereby permit calibration of the gauge after assembly by varying the shape and disposition of the elongate member.

26. In the gauge of claim 25, the improvement further comprising:

means in the fluid passage defining a valve seat;

valve means biased toward said valve seat for closing the passage; and means secured for movement by the diaphragm for controlling the valve means for closing the passage when a predetermined pressure in the chamber has moved the diaphragm a predetermined distance to thereby prevent excessive pressure in the chamber.

27. In a gauge of the type which includes a casing, means defining a pressure chamber, a flexible diaphragm in the pressure chamber, a fluid passage communicating with the pressure chamber, a movable indicator and motion transfer means for moving the indicator in response to movement of the diaphragm, the improvement wherein the motion transfer means comprises:

a crank arm in the casing;

means for transferring motion from the diaphragm to rotate the crank arm;

a linear member on the indicator lying substantially perpendicular to the axis of the crank arm and disposed proximate one end thereof;

an elongate member extending from the other end of the crank arm to a point spaced therefrom and then extending approximately parallel with the axis of the crank arm to engage the linear member on the indicator for moving said linear member when the crank arm is rotated to thereby permit calibration of the gauge after assembly by varying the shape and disposition of the elongate member.

28. In the gauge of claim 27, the improvement further comprising:

means in the fluid passage defining a valve seat;

valve means biased toward said valve seat for closing the passage; and means secured for movement by the diaphragm for controlling the valve means for closing the passage when a predetermined pressure in the chamber has moved the diaphragm a predetermined distance to thereby prevent excessive pressure in the chamber.

29. In a gauge of the type which includes a casing, means defining a pressure chamber, a flexible diaphragm in the pressure chamber, a fluid passage communicating with the pressure chamber, a movable indicator and motion transfer means for moving the indicator in response to movement of the diaphragm, the improvement further comprising:

means in the fluid passage defining a valve seat;

valve means biased toward said valve seat for closing the passage; and means secured for movement by the diaphragm for controlling the valve means for closing the passage when a predetermined pressure in the chamber has moved the diaphragm a predetermined distance to thereby prevent excessive pressure in the chamber.

References Cited

UNITED STATES PATENTS

| 1,700,449 | 6/1925 | Reilly | 73—408 |
|---|---|---|---|
| 1,781,287 | 11/1930 | Mayo | 73—368 X |
| 1,846,792 | 2/1932 | Carroll et al. | 73—431 X |
| 2,061,761 | 11/1936 | Gaiser | 73—408 |
| 2,241,573 | 5/1941 | Aschenbach. | |
| 2,914,949 | 12/1959 | Hastings | 73—406 |
| 3,068,702 | 12/1962 | Saddock | 73—408 |

LOUIS R. PRINCE, *Primary Examiner.*

D. O. WOODIEL, *Assistant Examiner.*